Figure 1A:
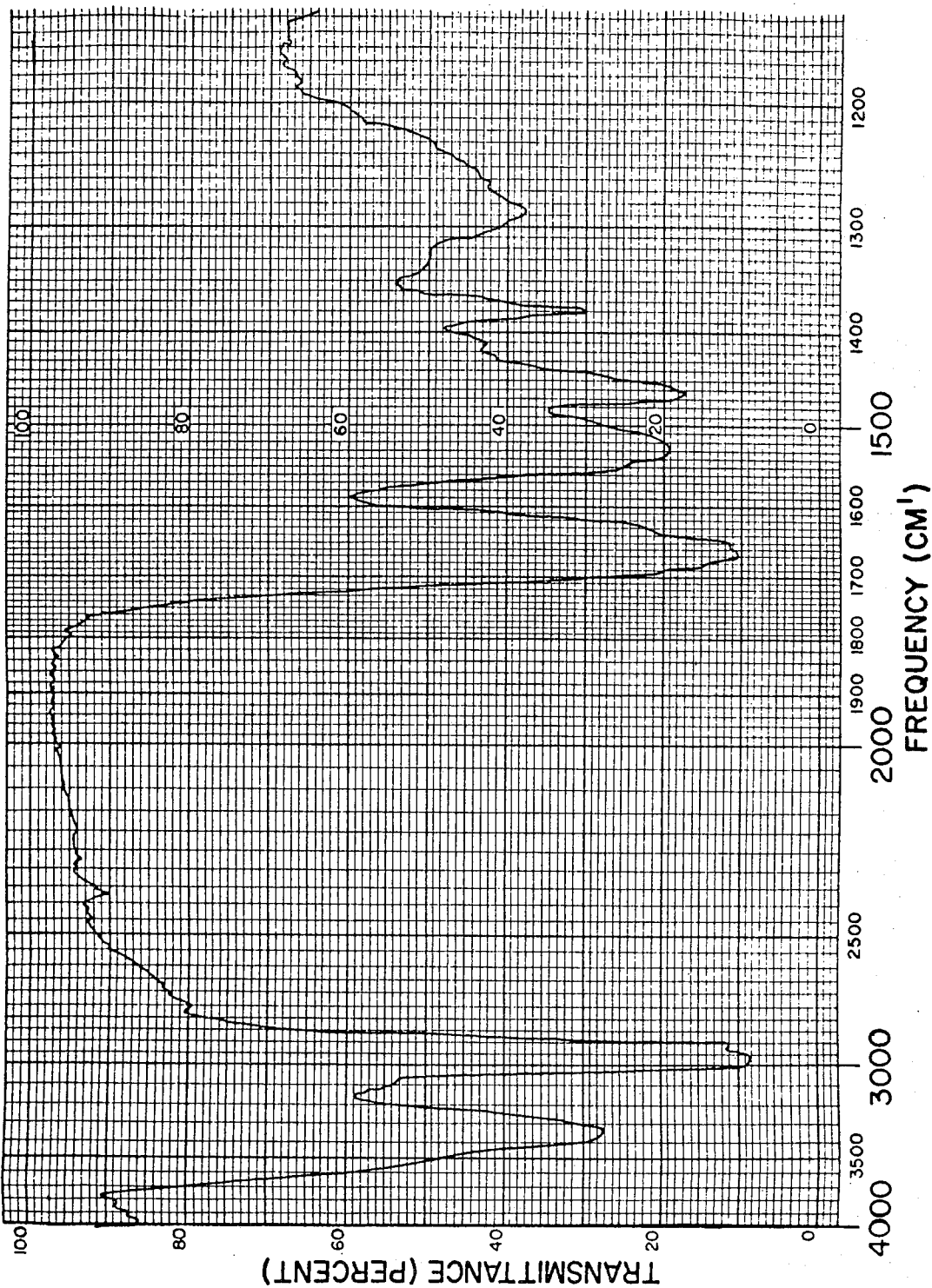
Figure 1B:
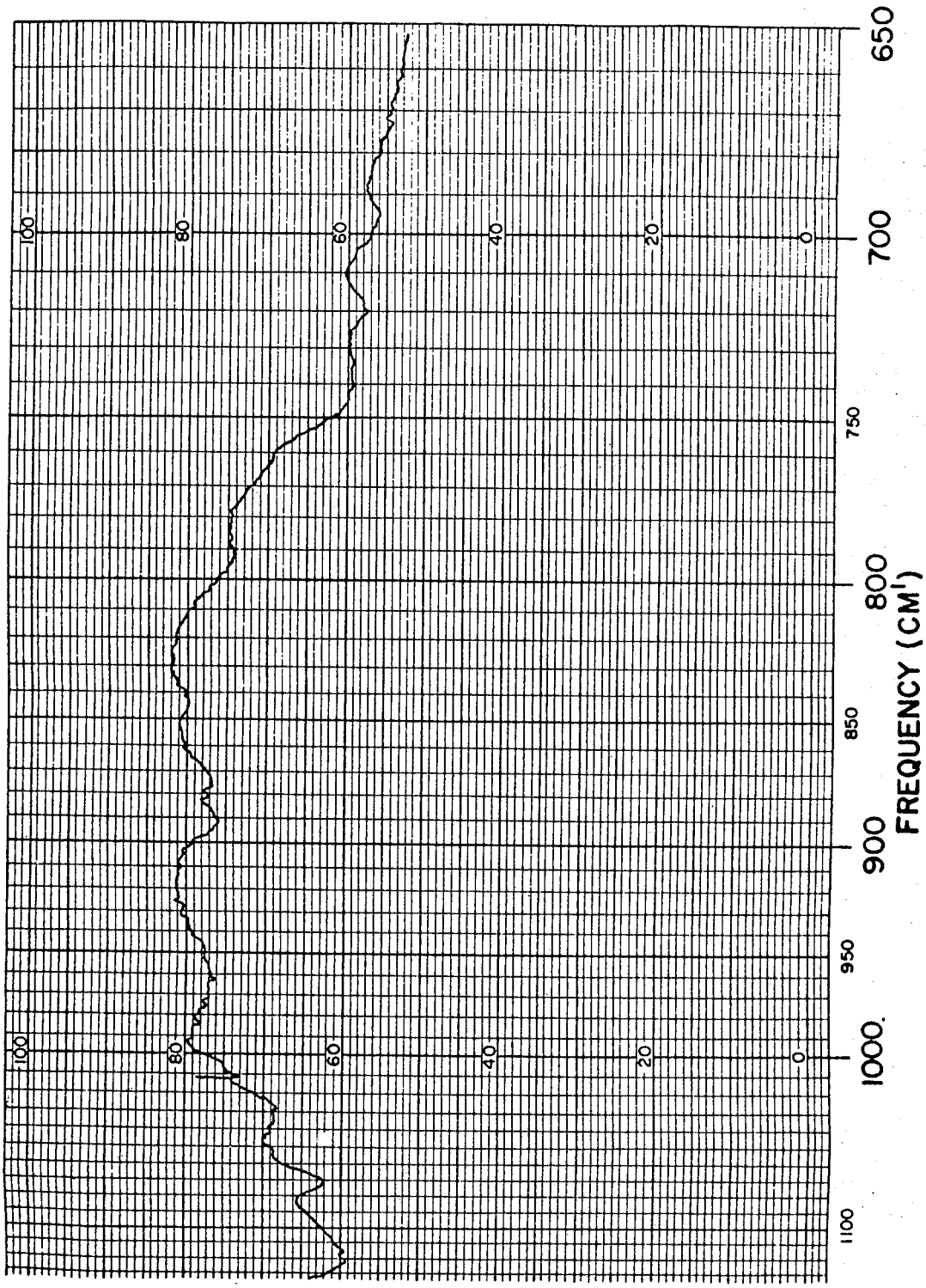

United States Patent
Coronelli et al.

[15] 3,697,646
[45] Oct. 10, 1972

[54] ANTIBIOTIC SUBSTANCE FROM A THERMOPHILIC ACTINOMYCETES

[72] Inventors: Carolina Coronelli, Renato Craveri, of Milan, Italy

[73] Assignee: Lepetit S.p.A.—Gruppo per la Ricerca Scientifica e la Produzione Chimica Farmaceutica, Milan, Italy

[22] Filed: April 2, 1969

[21] Appl. No.: 815,253

Related U.S. Application Data

[63] Continuation-in-part of Ser. No. 454,718, May 10, 1965, abandoned, and a continuation of Ser. No. 736,662, June 13, 1968, abandoned.

[30] Foreign Application Priority Data

May 22, 1964  Great Britain..........21,259/64

[52] U.S. Cl....................................424/117, 195/80
[51] Int. Cl. .............................................A61k 21/00
[58] Field of Search .........................424/117; 195/80

[56] References Cited

OTHER PUBLICATIONS

Chemical Abstracts 62:9481d (1965)
Derwent Farmdoc 31139, Brit. Patent 1,106,148, pages 513– 571, Published 3– 13– 68.

*Primary Examiner*—Jerome D. Goldberg
*Attorney*—Joseph Hirschmann

[57] ABSTRACT

A new polypeptidic sulfur containing antibiotic, named thermothiocin is obtained by cultivating under submerged conditions with aeration a strain to thermophilic Actinomyces named *Thermoactinopolyspora coremialis* in aqueous nutrient medium containing assimilable sources of carbon, nitrogen and sulfur at a temperature of 35° to 60° C and at a pH between 5 and 10.5 The antibiotic is active both in vitro and in vivo against Gram-positive bacteria.

3 Claims, 2 Drawing Figures

ANTIBIOTIC SUBSTANCE FROM A THERMOPHILIC ACTINOMYCETES

This is a continuation-in-part application of our copending application Ser. No. 454,718 filed on May 10, 1965, now abandoned, and a continuation of our application Ser. No. 736,662, filed June 13, 1968, now abandoned.

This invention relates to a substance having antibiotic properties and to the process for preparing it.

More particularly in accordance with the present invention there is produced a new polypeptidic sulfur containing antibiotic having high therapeutic action in vitro and in vivo, named thermothiocin.

The present invention also provides a process for producing thermothiocin which comprises cultivating under submerged conditions a thermothiocin producing strain of thermophilic Actinomyces named *Thermoactinopolyspora coremialis* ATCC 15974 in aqueous nutrient medium containing assimilable sources of carbon, nitrogen and sulfur. The strain *Thermoactinopolyspora coremialis* ATCC 15974 has been isolated from a sample of soil collected in a garden of Sao Paulo (Brazil). The micro-organism (which is an aerobic one) grows at a pH between 5 and 10.5 (with an optimum value of pH 7.5) and within a range of temperature from 35° to 60° C and shows the characteristics set out in the following Table 1.

TABLE 1

| Culture | Vegetative mycelium | Aerial | Soluble pigment | Biochemical properties |
|---|---|---|---|---|
| Soya-maltose-yeast agar | abundant growth, hyaline | yellow-whitish with good sporulation | pale brown | |
| Hickey-Tresner's agar | poor growth | very poor growth | absent | |
| Bennet's agar | abundant growth | rather poor growth with sporulation | pale brown | |
| Asparagine-glycerine agar | fair growth | poor growth | absent | |
| Oatmeal agar | fair growth | poor growth | pale brown | |
| Common agar | fair growth | poor growth | absent | |
| Peptone-iron agar | fair growth | poor growth rather | absent | no H$_2$S production |
| Skim-milk agar | abundant growth | poor growth with rare sporulation | pale brown | th positive very casein hydrolysis |
| Czapek-maltose agar | very poor growth | absent | absent | |
| Starch-synthetic agar | very poor growth | very poor growth | absent | starch hydrolysis negative |
| Tyrosine-synthetic agar | very poor growth | absent | | no melanine production |
| Cellulose-synthetic agar | very poor growth | very poor growth | | no cellulose hydrolysis |
| Calcium malate-synthetic agar | very poor growth | absent | | no calcium malate hydrolysis |
| Potato plug | no development | | | |
| Carrot plug | no development | | | |
| Gelatine | poor growth | absent | | liquefaction of gelatine |
| Meat broth | fair surface growth, flocculation at the bottom | | absent | |
| Nitrates | moderate surface growth, flocculation at the bottom | | absent | reduction to nitrites |

The above characteristics have been established after growth of the mycelium for one week at 48° C. For the composition of the different broth cultures, see Craveri and Pagani, Ann. di Microbiologia ed Enzimologia, 12, 115–130 (1962).

The mycelium produced by the microorganism has a radial development. The colonies show a hard, compact, well delimitated surface. Their round shape has, in general, a crater-like structure. During the growth, the formation of busting and tufty colonies is also noticed, due to the accumulation of many hyphae following to the excretion of glueing material. Such formations are interpreted as "coremia" in which the central part is constituted by non-sporulated mycelium of vegetative type around which an aerial mycelium apt to sporulation is formed.

The microorganism substrate forms well branched and interlaced hyphae; the aerial mycelium shows poorer and shorter ramifications. Spores, generally in number of 3 or 6 per chain, are spheric or ovoidal and have a size of about $2\,\mu \times 6\,\mu$.

As far as the production of thermothiocin is concerned the invention is not limited to the use of the above described strain of *Thermoactinopolyspora coremialis* but also includes the use of any thermothiocin producing strain of *Thermoactinopolyspora coremialis* such as one obtained by selection of variants and mutants obtained by treatment of spore suspensions of the above described organism with mutagenic agents, such as U.V. irradiation and mustard gas.

To produce thermothiocin, a thermothiocin producing strain of *Thermoactinopolyspora coremialis* is inoculated in a fermentation vessel and grown at a temperature between 30° and 50° C, preferably at 48° C for 8–55 hours, in a submerged aerated culture in an aqueous culture medium containing an assimilable source of carbon, nitrogen and sulphur. As a carbon source there can be used maltose, glucose, glycerine, mannite, amylose etc., as a nitrogen source peptone, yeast autolysate, aminoacids etc. and as a sulphur source, sulphur containing aminoacids and sulphur traces contained in peptone, yeast autolysate and raw maltose, amylose, etc..

When the fermentation is accomplished, the fermentation broth is filtered with the addition of a filter aid, such as celite. The filtered liquids are extracted with ethyl acetate, then brought to pH 3 and extracted twice with 30 percent butanol. The butanol extracts are washed with 30 percent of their volume of distilled water and then concentrated to about one-fourth. After 12–13 hours at 4° C the antibiotic precipitates spontaneously from the concentrated butanol solution. The product is filtered and washed with cold butanol.

A second crop of antibiotic is obtained by further concentration and cooling at 4° C. From 1 liter of fermentation broth 200 mg. of active substance (active at about 1.5 γ/ml. on *Staphylococcus aureus*) are obtained. The crude material is treated with methanol at 45° C, the solution is then filtered from insoluble impurities and concentrated to a small volume in order to allow the pure antibiotic (six times purer than the raw material) to precipitate.

Thermothiocin is an amorphous, yellow colored powder, whose physical and chemical characteristics recorded here below were determined on the substance repeatedly purified from methanol.

The elemental analysis gave the following values: C 46.01%; H 7.14%; N 14.5%; S 6.21%; O 26.14% (calculated by difference); $COCH_3$ 3.05%; $OCH_3$ absent.

The equivalent weight as determined potentiometrically according to Sorensen (titration with NaOH or with perchloric acid) gave a value of 1,500 which allows to calculate for thermothiocin the approximate empirical formula $C_{60}H_{110}N_{16}O_{25}S_3$. For this formula the theoretical data calculated (C 46.45; H 7.14; N 14.44; O 25.78; S 6.19; $COCH_3$ 3.6) are very good in agreement with the experimental ones.

The substance gets brown at about 250° C and does not melt until 300° C. The rotatory power is $[\alpha]_D^{25} +$ 29.4° (C, 0.5 in dimethylformaide). It is soluble in dimethylformamide, pyridine, dioxane; not very soluble in alcohols and in water at pH 7 and higher; insoluble in water at pH lower than 7, in ethylacetate, chloroform, benzene, acetone and ethers. The U.V. and the visible spectrum of thermothiocin do not show a clear maxima. In dimethylformamide a shoulder is present at 275 mµ.

The infrared spectrum of thermothiocin shows absorption maxima at the following values, expressed in $cm^{-1}$ (nujol): 3350, 1665, 1515, 1410, 1290, 1122, 1072, 1027, 961, 890, 876, 845, 794, 720, 697.

Thermothiocin gives a positive ninhydrin reaction after strong acid hydrolysis, a brown color with $FeCl_3$, and positive reaction with Tollens and Fehling reagents, with nitro-prussiate and ferrocyanide.

The strong acid hydrolysis of thermothiocin (concentrated hydrochloric acid in a sealed tube at 150° C for 12 hours) followed by a bidimensional thin layer chromatography, shows the presence of several aminoacids.

The chromatography has been carried out using two solvent sistems:

| | | |
|---|---|---|
| 1) | propanol: 34% ammonia | = 67:33 |
| | propanol: water | = 64:36 |
| 2) | phenol : water | = 75:25 |
| | chloroform: methanol: concentrated ammonia | = 2:2:1 |

Thirteen stains were revealed with ninhydrin sprayed on the plates (then warmed at 100° C for 15 minutes). Nine of these stains are probably: glycine, cysteine (or cystine), aspartic acid, methionine, lysine, γ-aminobutyric acid, alanine, phenylalanine and proline. These results have been obtained comparing the position on the plates of known aminoacids chromatographed under the same conditions.

Thermothiocin is very stable in the dry state. An aqueous solution at a pH comprised between 7 and 9 maintains 80 percent of its activity after 48 hours.

The antibiotic is active against Gram-positive bacteria and inactive against the Gram-negative ones, yeasts and fungi. The following table (Table II) is illustrative of the antibacterial activity in vitro of thermothiocin. The figures represent the minimal inhibitory concentrations in γ/ml.

TABLE II

| Microorganism | minimal inhibitory concentration γ/ml. |
|---|---|
| Staphylococcus pyoganes Var. aureus ATCC 6538 | 0.2 |
| Streptococcus faecalis ATCC 10541 | 5 |
| Streptococcus hemolyticus C 203 | 0.2 |
| Diplococcus pneumoniae L 27 | 0.2 |
| Bacillus subtilis ATCC 6333 | 1 |
| Bacillus cereus var. mycoides ATCC 9634 | 0.2 |
| Sarcina lutea | 0.5 |
| Corynebacterium equi | 1 |

Intraperitoneal administration of thermothiocin to albino rats at a dosage of 500 mg/kg gives a survival of 100 percent. The in vivo activity of thermothiocin has been tested with very satisfactory results on mice infected with *Streptococcus hemolyticus*. At the dosage of 1 mg/kg pro die during 4 days, administered subcutaneously, the antibiotic protected 90 percent of the mice. Against *Staphylococcus pyogenes* the protection of 80 percent of individuals occurred with administration of 15 mg/kg (5 days) of thermothiocin.

We claim:

1. An antibiotic substance designated as thermothiocin and being polypeptic in nature, having melting point over 300° C, whose elemental analysis is C 46.01%, H 7.14%, N 14.5%, S 6.21%, O 26.14% (by difference), having an approximate empirical formula $C_{60}H_{110}N_{16}O_{25}S_3$ and a specific rotatory power $[\alpha]_D^{25} +$ 29.4 (c 0.5, dimethylformamide), being soluble in dimethylformamide, pyridine, dioxane, slightly soluble in water at pH 7 and higher, slightly soluble in lower alkanols, insoluble in water at pH lower than 7, insoluble in ethyl acetate, chloroform, benzene, acetone, ethyl ether, showing in the ultraviolet and visible region of the spectrum a shoulder at 275 mµ in dimethylformamide, showing absorption maxima in the infrared region of the spectrum at the following frequencies expressed in $cm^{-1}$ (nujol):3350, 1665, 1515, 1410, 1290, 1122; 1072, 1027, 961, 890, 876, 845, 794; 720, 697.

2. A process for producing an antibiotic substance designated as thermothiocin, as defined in claim 1, which comprises cultivating under aerobic submerged conditions *Thermoactinopolyspora coremialis* ATCC 15974 in an aqueous nutrient medium having a pH between 5 and 10.5 at a temperature between 35° and 60° C, said nutrient medium containing a soluble carbon source, a source of assimilable nitrogen, a source of assimilable sulfur and essential mineral salts, for a period of 8–55 hours, and recovering thermothiocin from the medium.

3. A process for producing an antibiotic substance designated as thermothiocin, as defined in claim 1, which comprises cultivating under aerobic submerged conditions *Thermoactinopolyspora coremialis* ATCC 15974 in an aqueous nutrient medium having a pH between 5 and 10.5 at a temperature between 35° and 60° C, said nutrient medium containing a soluble carbon source, a source of assimilable nitrogen, a source of assimilable sulfur, and essential mineral salts, for a period of 8–55 hours, filtering the medium, extracting the filtrate with ethyl acetate, adjusting the pH of the aqueous phase to about 3, extracting the aqueous phase with butanol and recovering thermothiocin from the butanol extract.

* * * * *